May 23, 1950   E. W. JACKOBOICE   2,508,756
PUMP MOUNTING AND DRIVE
Filed Dec. 6, 1948

INVENTOR
EDWARD W. JACKOBOICE
BY Liverance and
Van Antwerp
ATTORNEYS

Patented May 23, 1950

2,508,756

UNITED STATES PATENT OFFICE 2,508,756

PUMP MOUNTING AND DRIVE

Edward W. Jackoboice, Grand Rapids, Mich.

Application December 6, 1948, Serial No. 63,740

2 Claims. (Cl. 290—1)

This present invention is concerned with and directed to a novel and practical pump mounting and drive for the pump, by means of which the internal combustion engine of a truck or like motor vehicle may have readily mounted thereon a rotary pump, which may be driven for the purpose of supplying liquid under pressure to hydraulically operate devices mounted upon the truck or other vehicle. For example, trucks are frequently equipped with dumping bodies which are hydraulically lifted to dumping position, by pumping oil, as the liquid used, to a hydraulic hoist for lifting the body. With my invention the pump may be very readily and easily mounted upon the engine and located in a proper position such that it may be driven by the fan belt of the engine which is interposed between the engine crankshaft and a fan. With my invention the fan belt is replaced by one of a greater length and the pump is mounted upon the generator, which is also driven by the fan belt, and may be readily adjusted to proper position upon said generator so that a pulley on the shaft of a pump is located in the same vertical plane with the drive pulley for the belt on the engine crankshaft and the driven pulleys for the fan and generator. The invention is of a very practical and simple character and may be readily applied to and connected with and mounted upon such generators.

Figure 1:
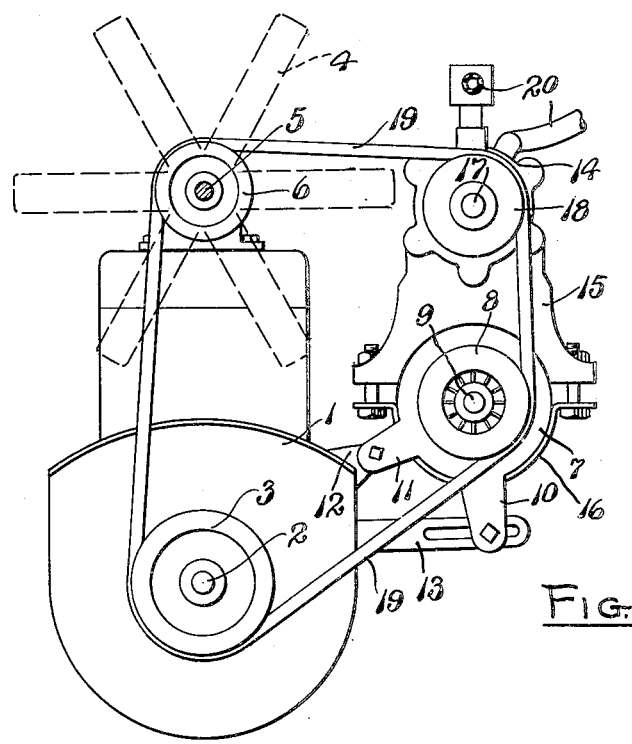
Figure 2:
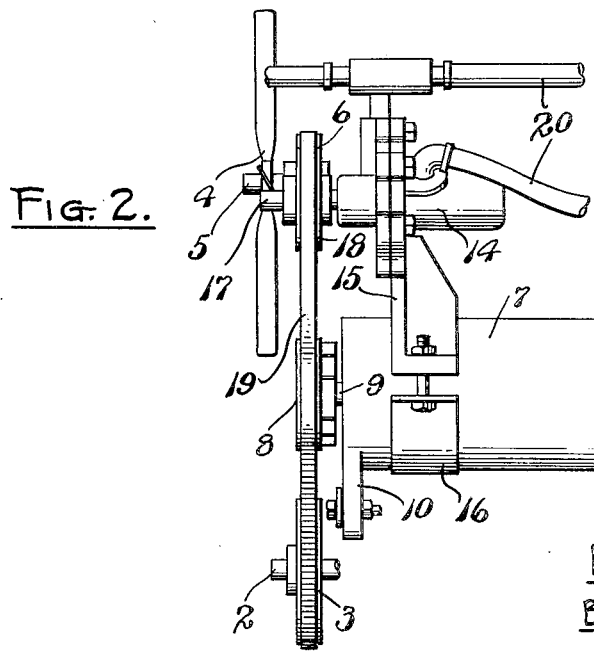

An understanding of the invention may be had from the following description, taken in connection with the accompanying drawing, in which:

Fig. 1 is a front elevation, with one part shown in section, showing a motor vehicle engine including the generator, the pump mounted on the generator and the fan belt pulley, which are likewise shown in front elevation, and Fig. 2 is a side elevation of the structure shown in Fig. 1, the engine being removed.

Like reference characters refer to like parts in the two figures of the drawing.

The block 1 of an internal combustion engine is of a conventional character and has a crankshaft 2 mounted to turn upon a horizontal axis at the end of which a driving pulley 3 is secured. The fan 4 carried on a shaft 5, and said shaft having a driven pulley 6, is mounted in the usual manner on the engine block, the fan pulley 6 being over and in the same vertical plane with the drive pulley 3. The generator having a cylindrical housing or casing 7 is located at one side of the engine block, having a driven pulley 8 at the forward end of its shaft 9. From the generator housing 7 generally radial arms 10 and 11 spaced from each other extend therefrom, the latter pivotally connected to a lug 12 on the engine block, and the former having an adjustable bolt and slot connection to a fixed arm 13 extending horizontally from the engine block as shown in Fig. 1.

This conventional construction provides the environment for the assembly and combination therewith of the hydraulic rotary pump, which may be a gear pump or other suitable pump of rotary character. The pump 14 is located above the generator housing 7 and has associated and connected therewith a downwardly extending supporting bracket 15, formed at its lower side with an upwardly extending concave recess shaped to receive the upper side portion of the generator housing 7. Such bracket may be placed upon the generator housing and releasably and adjustably clamped in position by a clamping band 16, which goes underneath the generator housing 7, and has oppositely extending ears at its ends for bolts to pass through, the bolts also passing through overhanging parts of the bracket 15 directly above such ears. Tightening the bolts secures the pump in any position to which it has been adjusted, and by loosening the bolts it may be shifted and adjusted to another position, or removed.

The shaft 17 of the pump upon which the gears or pump rotor is mounted has a driven pulley 18 at its forward end. Such pulley is to be located in the same vertical plane with the other pulleys 3, 6 and 8 previously described. The adjustability of mounting the pump upon the generator housing 7 permits the ready location of such pulley 18 in the desired vertical plane.

The endless belt 19 will be of a greater length than the ordinary fan belt which, before attachment of the pump, passes around the pulleys 3, 6 and 8. With the pump assembled and secured in place, the longer fan belt 19 passes around the four pulleys 3, 6, 8 and 18 so that the fan, generator and pump are continuously driven when the engine is in operation. The usual inlet and outlet conduits or pipes and hose connections are a part of the pump assembly and need not be further described.

With my invention, the equipping of an internal combustion engine of a conventional design is rendered very practical and easy. Thus, when a motor truck, for example, is to be equipped with a dumping body and hoisting equipment therefor, or any other hydraulically operated accessory, the pump for pumping the hydraulic liquid is very quickly and easily attached and properly adjusted and located in position with its shaft pulley in the same plane with the fan generator shaft pulley and the drive pulley from the engine crankshaft. The invention in use has proved very practical and serviceable.

The claims appended hereto define the invention and are to be considered comprehensive of all forms of structure coming within their scope.

I claim:

1. In a structure of the class described, including an internal combustion engine and a generator belt driven by pulleys from the crank shaft of said engine, of a rotary pump, a supporting bracket on said pump, the lower end of which has a recess conforming to the upper surface of the generator, whereby said bracket may be seated upon the upper side of the generator a clamping band of flat metal adapted to conform to the underside of the generator, and means for releasably connecting said clamping band at its ends to said bracket, whereby said pump is adapted to be adjusted to different positions in the length of the generator and to different angular positions around the generator, the shaft of said rotary pump having a pulley thereon which in such adjustment lengthwise of the generator housing may be disposed in the same plane with the pulleys on the engine crank shaft and on the shaft of the generator, adapting the pump and generator to be simultaneously driven by a single endless belt.

2. The combination with an engine and a fan and electric generator driven thereby, of a pump having a mounting bracket adjustably attached to said generator for adjustment both longitudinally and circumferentially thereof, each of said engine, fan, generator and pump having a pulley all in the same plane, and a single endless belt encircling all of said pulleys.

EDWARD W. JACKOBOICE.

REFERENCES CITED

The following references are of record in the file of this patent:

UNITED STATES PATENTS

| Number | Name | Date |
| --- | --- | --- |
| 1,119,151 | Halbleib | Dec. 1, 1914 |
| 1,382,013 | Schreiber | June 21, 1921 |
| 1,953,331 | Armstrong | Apr. 3, 1934 |
| 2,086,441 | Rushmore | July 6, 1937 |
| 2,186,080 | Sheldrick | Jan. 9, 1940 |
| 2,433,573 | Montgomery | Dec. 30, 1947 |